United States Patent Office 3,023,106
Patented Feb. 27, 1962

3,023,106
POWDERED INSTANT BEVERAGE MIX
James L. Common, Briarcliff Manor, N.Y., assignor to General Foods Corporation, White Plains, N.Y., a corporation of Delaware
No Drawing. Filed Sept. 2, 1958, Ser. No. 758,568
7 Claims. (Cl. 99—78)

This invention relates to a new beverage preparation of the fruit flavored type. More particularly, the invention relates to a beverage preparation of the type described which is adapted to be prepared and marketed in a substantially dry powdered form and which is capable of being reconstituted by the addition of cold water at the time of consumption to provide an instantly prepared fruit flavored beverage; also, the invention relates to agents for use in such preparations to improve the appearance and palatability thereof.

Prior to the present invention, beverage mixtures of the fruit acid type have been prepared by mixing a fruit acid such as tartaric acid with sugar and suitable color and fruit flavor. Such preparations, however, have had a very limited use in commerce because they lack the non-watery mouth feel and fullness of natural fruit juice. Moreover, they have been lacking in the desired property of opacity or cloud inherent in natural fruit juice. Thus, fruit-flavored beverages which are not opaque or turbid have an artificial appearance which is not consistent with the appearance of natural fruit juice. It would be desirable to incorporate a substantially stable clouding agent in an instant powdered fruit juice-like composition which agent avoids both clarification of the beverage either by sedimentation of the clouding agent or its separation out on the surface of the beverage. At the same time, it would be desirable to provide an instantly prepared beverage mix which offers the mouth feel of natural fruit juices such that the mix can be employed as a palatable beverage "bracer" which may or may not have incorporated therein nutritional agents like mineral salts and vitamins.

It is a primary object of the present invention to provide a dry powdered fruit flavored beverage composition of the character indicated which can be readily reconstituted in cold water with gentle spoon stirring and which, upon such reconstitution, will produce a fruit flavored beverage closely resembling the opacity, appearance, mouth feel and palatability of natural fruit juices. It is a further object of this invention to provide a fruit flavored beverage mix capable of fortification with desirable vitamins and minerals. Other objects and advantages of the invention will appear from the following description and examples presented.

The objects of the present invention are in general attained by admixture with an edible acidic substance, sugar, flavoring and coloring ingredients of a dried emulsion of a plastic fat and a hydrophilic encapsulating colloidal material, typically a water-soluble gum like gum arabic, gum tragacanth, gum acacia and the like, wherein the fat is present in a minor proportion and the colloidal water-soluble gum is present in a major proportion. The term "edible acidic substance" is intended to describe edible acids like citric, tartaric, adipic, fumaric and like oxy-acid as well as the salts and acid salts of these acids like sodium citrate, the tartrates, and the like and mixtures of these acids, salts and acid salts. The dried emulsion may be characterized as comprising a matrix of water-soluble constituents having as the dispersed phase therein discrete small particles of fat. In achieving such a matrix and dispersed fat phase, sufficient colloidal materials should be employed to insure that when an emulsion prepared from an aqueous colloidal suspension having melted fat particles dispersed therein is dried by such means as a spray dryer to a stable moisture content below 5% and in the order of 3%, the fat will be effectively released in discrete colloidal form when the emulsion is reconstituted. The plastic fat of the dried emulsion should have a melting point whereat upon reconstitution of a beverage mix containing the dried emulsion, the fat will not coalesce and "cream off" to the surface of the reconstituted beverage.

In achieving the dried emulsion of the aforesaid character, that is, of a type which will be readily reconstitutable in water with gentle stirring and which will neither float to the top of the liquid nor accumulate at the bottom of the liquid, it is important to homogenize the aqueous emulsion of the water-soluble gum and the plastic fat to the extent that very discrete particles are formed and also to the extent that the dried emulsion has a desired particle size distribution. In practice, the preferred procedure for achieving this discrete emulsion of plastic fat particles is to process the aqueous suspension of melted plastic fat and gum arabic through a Manton-Gaulin homogenizer. This homogenizing valve essentially comprises a floating cylindrical valve having longitudinal flutes which guide the valve within an annular seat, the valve engaging a cylindrical plunger having a chamfered surface urged against a chamfered surface on the valve seat by spring pressure. By the shearing force applied to the aforesaid suspension as it passes between the plunger and the valve seat, globules of melted plastic fat are sheared and reduced in size; the degree of homogenization is expressed in terms of pressure applied to the emulsion intermediate the chamfered surfaces of the valve seat and the plunger. As homogenization pressure is increased, the ability of the dried emulsion to display desired cloud properties is improved. Thus, as homogenization pressures of 500 p.s.i.g. and above and ranging from 500–2000 p.s.i.g. are practiced, the average particle size of the dried emulsion will increase and the ability of the dried emulsion to demonstrate improved cloud properties will also increase. At homogenization pressures below 500 p.s.i.g., the dried emulsion will not demonstrate desired cloud properties but rather, when incorporated into a beverage mix, will produce a quantity of unsightly floating scum at the surface of the beverage preparation. On the other hand, when no homogenization is practiced before spray drying the aqueous suspension of gum arabic or other water-soluble gum and melted plastic fat, the average particle size will be quite small such that when the dried emulsion is employed in combination with other beverage mix ingredients, it will drop to the bottom of the liquid as an unsightly "precipitate." Although the foregoing phenomena have been described with reference to data obtained when employing a Manton-Gaulin homogenizing valve, other means for effecting emulsification of the melted fat globules may be employed and indeed a plurality of homogenizing valves in series may be practiced; hence, an ultra-sonic homogenizer or a colloid mill can also be employed.

The influence of homogenization pressure on cloud properties will be evident from the following table:

*Effect of Homogenization Pressure on Cloud Properties*

[Screen analysis (U.S. Sieve Series)]

| Run homogenization | | Percent cloud | | | | Remarks |
|---|---|---|---|---|---|---|
| No. | Pressure, p.s.i.g. | +20 | +30 | +100 | −100 | |
| A | 2,000 | Tr. | 1 | 91 | 8 | 100% dried emulsion. |
| B | 1,000 | Tr. | Tr. | 97 | 3 | Do. |
| C | 500 | Tr. | Tr. | 89 | 11 | 90 g. dried emulsion plus 10 g. tricalcium phosphate. |

*Emulsion Stability After 24 Hours and Emulsion Opacity*

| Run No. | Emulsion stability | Emulsion opacity, K.S. units |
|---|---|---|
| A | Good | 199 |
| B | ___do___ | 196 |
| C | ___do___ | 209 |

In general, it has been observed that the dried emulsion should have a particle size distribution whereat no more than 25% by weight passes through a U.S. Sieve Series No. 100 screen. Since the dried emulsion may require the incorporation of an agent to promote flowability, viz., tricalcium phosphate (TCP), and since the lack of flowability can influence particle size distribution data, the above figure on average particle size can be expressed by stating that not more than 65% should pass through a U.S. Sieve Series No. 100 screen when 10% by weight TCP is blended therewith. In addition, 100% of the dried emulsion, when blended with 10% by weight TCP, should pass through a U.S. Sieve Series No. 20 screen, since particles of a larger size have generally been observed to be case hardened and relatively insoluble such that the desired clouding effect will not be attained.

In preparing a dried emulsion of the above type it is generally required that a plastic fat be employed. The term "plastic fat" is intended to cover a fat which is semi-solid at room temperature, that is, a product which is a mixture of fats and oils at temperatures in the order of 60° F. A plastic fat may be compounded by any one of a number of means known to those versed in the art such as by hardening through hydrogenation of vegetable oils and comprises a blend of such fats and oils. Typically, coconut oil may be hydrogenated to give a semi-solid material having a Wiley melting point of 98° F., a capillary melting point of 104° F., an iodine value of 5.2, a saponification number of approximately 253, and a solids content index of 43% at 20° C. To this material is added 6% stearin to yield a partially solidified fat having a Wiley melting point of 111° F., a capillary melting point of 116° F., an iodine value of 2.2, a saponification number of approximately 254, and a solids content index of from 48–50% solids at a temperature of 20° C.

It is also a feature of the present invention that an alkali metal salt of carboxymethyl cellulose (CMC) is employed in the dry powdered beverage mix. CMC provides a means of creating the desired mouth feel or body such that, when it is employed in combination with the clouding agent, a fruit juice character is obtained.

The sodium carboxymethyl cellulose is preferably of low viscosity although a high and medium viscosity sodium CMC may also be employed. The colloidal properties of the CMC can be altered not only by selection of the appropriate viscosity but also by adjustment of the level employed. In general, however, it has been observed that where high viscosity CMC is employed, there is a tendency for the CMC to coalesce due to difficulties experienced in causing the CMC to hydrate in cold water. In general, the level of CMC employed will vary from 0.25–1.5%. The CMC should be of a particle size distribution whereat a minimum percentage of fines is present since such fine particles have been observed to rise to the surface of the beverage prepared upon reconstitution and collect in the form of "fish eyes" as a slimy layer at the perimeter of the surface of the beverage; in this connection, for a low viscosity CMC wherein the degree of substitution for reactive hydroxyl groups in each anhydroglucose unit of the CMC will range between 0.65–0.85, all of the CMC powder should pass through a U.S. Sieve Series No. 30 screen, not over 80% should pass through a U.S. Sieve Series No. 100, nor over 65% through a U.S. Sieve Series No. 200.

The invention will now be more fully described in the following example.

The clouding agent was prepared by spray drying an aqueous emulsion of one part plastic fat of the above-stated type to four parts gum arabic, the emulsion having a 40% solids concentration. Spray drying was carried out in a vertical spray dryer having an inlet temperature of 530° F. and an outlet temperature of 270–280° F. Prior to spray drying, the emulsion was homogenized at a pressure of 1000 p.s.i.g. and the emulsion thus produced was fed to the drying nozzle at a temperature of 115–130° F., the pressure at the atomizing nozzle being 1500 p.s.i.g. and the inlet air flow being 2200 cubic feet/minute with the exhaust air flow being 3900 cubic feet/minute. Under these conditions approximately 376 pounds of product per hour were recovered.

Although proportions of one part plastic fat to four parts gum arabic were employed, levels of gum arabic ranging from 1:4 to 1:9 have been found to be operable. The spray dried emulsion was cooled to below room temperature, that is, below 60° F. and had the following powder properties:

| Granulation, percent | | | Moisture, percent H$_2$O | Fat, percent | Density, gm. cc. | Emulsion stability | Emulsion opacity, K.S. units |
|---|---|---|---|---|---|---|---|
| −20 mesh | −30 mesh | −100 mesh | | | | | |
| 100 | 97 | 16 | 2.0 | 21.7 | 0.32 | Stable | 200 |

Preferably the clouding agent should have a particle size distribution whereat 100% passes through a U.S. Sieve Series No. 20 screen with a maximum of 65% passing through a U.S. Sieve Series No. 100 screen and 35% passing through a U.S. Sieve Series No. 140 screen. The cloud should not have a particle size distribution finer than the above since it has been observed that upon reconstitution in a beverage mix proper dispersion of the fat will not be obtained such that the desired beverage opacity will not be accomplished. At finer granulations the discrete fat particles have been observed to rise to the surface of the beverage. The dried emulsion should be capable of producing an emulsion opacity ranging from 180–240 Klett Summerson units for a 0.0755% aqueous solution using a No. 66 filter and a 20 mm. cell width. The dried emulsion cloud should have a density ranging from 0.31–0.40 grams/cc. and preferably about 0.35 gram/cc.

A fruit flavored beverage mix was prepared employing the foregoing cloud and the above specified low viscosity CMC in accordance with the following formulation:

| Ingredients: | Parts by weight |
|---|---|
| Sucrose | 89.28 |
| Citric acid | 5.53 |
| Clouding agent | 2.28 |
| Sodium carboxymethyl cellulose (low viscosity) | 0.90 |
| Tricalcium phosphate | 0.49 |
| Trisodium citrate | 0.70 |
| Vitamin C | 0.47 |
| Tenfold orange oil | 0.26 |
| Vitamin A | 0.04 |
| Color (mixture of F.D. & C. No. 5 and F.D. & C. No. 6 yellow) | 0.01 |

Sixty-five grams of the above beverage mix was reconstituted in a pint of water and produced a beverage demonstrating highly acceptable mouth feel, cloud stability, and natural fruit juice appearance. After four days' standing in a refrigerator at a temperature of 45° F., no apparent separation of the discrete plastic fat particles occurred.

While the present invention has been described with particular reference to specific examples, it is not to be

What is claimed is:

1. A fruit flavored beverage mix comprising in combination an edible acidic substance, sugar, fruit flavor and color, and a dried emulsion of a homogenized plastic fat coated with a water-soluble gum, the fat being present in a minor proportion and the gum being present in a major proportion, the dried fat emulsion having a particle size distribution whereat with 10% tricalcium phosphate added 100% passes a No. 20 screen and no more than 25% of the dried fat emulsion alone passes a No. 100 screen.

2. A fruit flavored beverage mix according to claim 1 wherein the fat is homogenized at a pressure above 500 p.s.i.g.

3. A fruit flavored beverage mix according to claim 1 wherein the fat is homogenized at a pressure between 500 and 2000 p.s.i.g.

4. A fruit flavored beverage mix according to claim 1 having an alkali metal salt of carboxymethyl cellulose added thereto.

5. A fruit flavored beverage mix comprising in combination an edible acidic substance, sugar, fruit flavor and color, and a dried emulsion of a plastic fat coated with a water-soluble gum, the fat being present in a minor proportion and the gum being present in a major proportion, said emulsion having a particle size distribution whereat with 10% tricalcium phosphate added 100% passes a No. 20 screen and no more than 25% of the dried fat emulsion alone passes a No. 100 screen, and an alkali metal salt of carboxymethyl cellulose having a particle size distribution such that 100% passes a No. 30 screen and not over 80% passes a No. 100 screen.

6. A fruit flavored beverage mix consisting of an edible food acid, sugar, fruit flavor and color, and a dried emulsion of one part of hydrogenated coconut oil having a Wiley melting point of 111° F., an iodine value of 2.2, a saponification number of 254 and a solids content index of 48–50 percent at 20° C. and four parts gum arabic, the dried emulsion having a particle size distribution whereat with 10% tricalcium phosphate added 100% passes a No. 20 screen and no more than 25% of the dried fat emulsion alone passes a No. 100 screen.

7. A method of preparing a fruit flavored beverage mix comprising homogenizing a mixture of a minor amount of a plastic fat and a major amount of a water soluble gum at a homogenization pressure greater than 500 p.s.i.g. to create a homogenized oil and water emulsion, spray drying this homogenized emulsion to form a powderous dried fat emulsion, the dried fat emulsion having a particle size distribution whereat with 10% tricalcium phosphate added 100% passes a No. 20 screen and no more than 25% of the dried fat emulsion alone passes a No. 100 screen, admixing this powderous dried fat emulsion in a separately dried physical mixture of a dried edible food acid, sugar, dried coloring and flavoring ingredients.

References Cited in the file of this patent

UNITED STATES PATENTS

| | | |
|---|---|---|
| 2,555,465 | Bogin et al. | June 5, 1951 |
| 2,556,233 | Stokla et al. | June 12, 1951 |